UNITED STATES PATENT OFFICE 2,486,796

ESTERS OF 1-ALKYL-4-HYDROXYPHENYL-PIPERIDYL-4-KETONES

Karl Miescher, Riehen, and Hans Kaegi, Basel, Switzerland, assignors to Ciba Pharmaceutical Products, Inc., Summit, N. J.

No Drawing. Application December 17, 1946, Serial No. 716,888. In Switzerland June 25, 1943

4 Claims. (Cl. 260—294)

This application is a continuation-in-part of our copending application Serial Number 592,535, filed May 5, 1945, now Patent 2,486,794, which itself is a continuation-in-part of our copending application Serial Number 530,742, filed April 12, 1944, now Patent 2,486,792.

The present invention relates to 4-aryl-piperidine-4-carboxylic acid nitriles, the corresponding esters, amides and ketones. The present application, as is manifest from the appended claims, relates more particularly to new esters of 4-phenyl-piperidyl-(4)-ketones.

These 4-aryl-piperidines are obtained by causing α-arylated tertiary γ-amino fatty acid nitriles to react with reactive esters of alkylene-1:2-diols in the presence of acid binding agents in one or more steps, if desired, converting the nitrile group in the 4-aryl-piperidine-4-carboxylic acid nitriles obtained into an ester, an amide or a keto group, and, if desired, splitting off radicals which are suitable for being eliminated and are attached to the cyclic nitrogen at any phase of the reaction.

As starting products there are used therefore α-arylated tertiary γ-amino fatty acid nitriles in which the aryl group may be represented, e. g. by a substituted or unsubstituted phenyl or naphthyl group, the substituents being in any position. The aliphatic radical can be straight or branched or even arranged as part of a ring. For example the following compounds can be used: α-phenyl-γ-(methyl-benzyl-amino)-butyric acid nitrile, α-phenyl-γ-(dimethyl- or diethyl-amino)-butyric acid nitrile, α-(benzyl-oxy- or acyloxy - phenyl - γ - (methyl - benzyl - amino) - butyric acid nitriles, α-(o-anisyl) - γ - (methyl-diphenylmethylamino) - butyric acid nitrile, α-(m-anisyl)-γ-dimethyl-amino-butyric acid nitrile, α-phenyl-γ-(methyl-benzyl-amino)-valeric acid nitrile, α-naphthyl-γ-(dimethyl-amino)-butyric acid nitrile or α-phenyl - α - [o - (methyl - benzyl - amino)-cyclohexyl]-acetic acid nitrile. The above mentioned starting products are in some instances known or can be obtained in a known manner.

For the reaction with the above nitriles the following reactive alkylene-1:2-diol-esters, for example, come into consideration: ethylene-dibromide, ethylene-chlorobromide, ethylene-diiodide, propylene-1:2-dibromide, propylene-1:2-chloro-bromide, butylene-1:2- or 2:3-dibromide, β-chloro-ethanol-p-toluene-sulfonic acid ester, glycol-dipara-toluene sulfonic acid ester or propane-1:2-diol-dimethane sulfonic acid ester.

The reaction itself is carried out in the presence of acid binding agents. For this purpose the following can be used: sodium, potassium, lithium, calcium, as such or in a form of their alcoholates, amides, hydrides or hydrocarbons, as e. g. potassium-tertiary butylate, potassium-tertiary amylate, sodium amide, sodium hydride, butyl-lithium, phenyl-sodium or phenyl-lithium. It is advantageous to use inert solvents such as, e. g. ether, benzene, tolueune, xylene or hexane and to work in the presence of indifferent gases such as nitrogen. According to the reactivity of the components, the reaction is carried out with cooling, at ordinary temperature or even with heating. It is possible to close the ring in one or more steps.

The nitrile group of the compounds thus obtained may be converted in known manner into an ester group or even into a keto group. The nitrile group can also be converted into an amide group in known manner either directly or after conversion into the carboxyl group. The obtained piperidines contain a quaternary ring nitrogen atom. They can be converted into such with tertiary nitrogen, for example, by splitting off alkyl halide by heating. The conversion also succeeds easily if there is as a radical attached to the nitrogen, e. g. a mono-, di- or tri-aryl methyl group which can be removed, among others under the influence of catalytically activated hydrogen or by treatment with e. g. acids or by heating. This conversion can moreover be carried out at any desirable phase of the reaction. If the aryl radical of the reaction products contains one or several substituted hydroxyl groups, these can be converted into unsubstituted hydroxyl groups in the usual manner, for example by treatment with glacial acetic hydrohalic acids.

Any compounds resultant from this reaction which contain free hydroxyl groups in the aryl radical, for instance, 4-(meta-hydroxyphenyl)-piperidyl-(4)-ketones such as 1-alkyl-4-(meta-hydroxyphenyl) - piperidyl - (4) - alkylketones may be treated with esterifying agents, such as acid halides or acid anhydrides. There can be produced in such manner esters of organic acids, such as aliphatic, alicyclic, aralicyclic, aromatic or heterocyclic acids, for example of the ethoxycarboxylic acid, acetic acid, propionic acid, butyric acid, benzoic acid, or nicotinic acid.

The process is further elucidated by formulas on the basis of the following scheme:

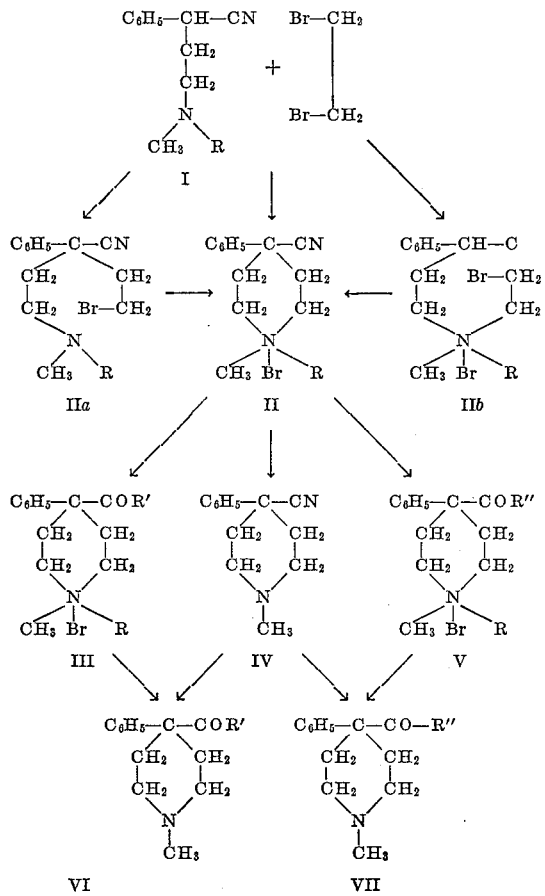

R = hydrocarbon radical capable of being split off
R' = alcohol radical or substituted or unsubstituted amino group
R'' = hydrocarbon radical According to the present process a large number of piperidine compounds can be obtained. As a result of the considerable possibilities of variation, numerous new compounds are accessible in addition to known compounds. Of particular interest is the discovery that, for example, the reaction of ethylene-dibromide with a compound of the Formula I according to the above scheme leads pre-eminently to cyclic compounds and not to acyclic ones. It also seems surprising, for example, that the conversion of a compound of the Formula II, in which R represents a hydrocarbon radical capable of being split off, e. g. benzyl, into the compound of the Formula IV under the influence of catalytically activated hydrogen occurs without attacking the nitrile group.

The following examples illustrate the invention, the parts being by weight unless otherwise stated and the relationship of parts by weight to parts by volume being the same as that of the kilogram to the liter.

Example 1

52.8 parts of α-phenyl-γ-(methyl-benzyl-amino)-butyric acid nitrile (B. P. $_{0.1\ mm.}$ 153–155° C., prepared from benzyl cyanide and β-chloroethyl-methyl-benzyl-amine in the presence of sodium amide) in 200 parts of ether are added drop by drop while stirring to 10 parts of powdered sodium amide which is suspended under nitrogen in 200 parts of ether. When the reaction is complete, the mixture is stirred for an hour, then 300 parts of ether are added, the whole is cooled with ice and 40 parts of ethylene-dibromide are added. Stirring is then resumed for an hour under ice cooling, for another hour at room temperature and for 4–5 hours by heating to 40° C. A thick suspension of salts is formed. This is decomposed with water and aqueous hydrobromic acid is added until the mixture shows an acid reaction. The 1:1-methyl-benzyl-4:4-phenyl-cyano-piperidinium bromide formed, which is difficultly soluble in water, is precipitated and isolated by filtration with suction and washing with ether and water. It still contains some hydrobromide of the starting product as well as other by-products. For purification the crude bromide is dissolved in the just necessary quantity of boiling water, soda solution is added and the mixture is allowed to cool. The thick mass is thoroughly shaken with ether which dissolves the non-quaternary bases. After filtration with suction and washing with water and ether the remaining salt is recrystallized from the fourfold quantity of boiling water. Thus a good yield of the pure 1:1-methyl-benzyl-4:4-phenyl-cyano-piperidinium-bromide is obtained in two crystalline forms, as glossy flakes and as white aggregates, which cannot be converted into each other and probably represent cis-trans-isomers. The melting point of both bromides is not sharp and lies at about 245 to 260° C.

If the bromide is shaken in aqueous alcoholic solution with hydrogen and palladium black, 1-methyl-4-phenyl-4-cyano-piperidine is formed almost quantitatively from both crystalline forms besides toluene. The 1-methyl-4:4-phenyl-cyano-piperidine can be saponified and esterified with ethanol in known manner to produce 1-methyl-4:4-phenyl-carbethoxy-piperidine.

The same substance is obtained, if the quaternary bromide is heated with sulfuric acid of about 70 to 80 per cent. strength, the resulting acid esterified with ethanol and the product subsequently hydrogenated.

Example 2

A solution of 52.8 parts of α-phenyl-γ-(methyl-benzyl-amino)-butyric acid nitrile in 200 parts of ether is added drop by drop to 10 parts of powdered sodium amide in 200 parts of ether. After stirring for 1 hour, a solution of 50 parts of propylene-1:2-dibromide in 100 parts of ether is added. The ether slowly reaches its boiling point, the boiling temperature being maintained for 2 hours by external heat. In this reaction only sodium bromide is precipitated and no quaternary salt. On decomposition of the reaction product with water an ethereal and an aqueous layer are obtained which are easily separated. After evaporation of the ether an oil is obtained from the ethereal layer which after prolonged heating on the water bath becomes solid and insoluble in ether. Obviously the formation of the ring of the quaternary bromide occurs only after applying considerable heat. The product is triturated with ether, filtered with suction and thus the 1:1-methyl-benzyl-2-methyl-4:4-phenyl-cyano-piperidinium bromide is obtained. The product is dissolved without further purification in the tenfold quantity of alcohol of 50 per cent. strength and after the addition of about 2 per cent. of a platinum catalyst shaken up with hydrogen. When no more hydrogen is absorbed, the whole is filtered with suction, a greater part of the filtrate is evaporated and the residue is rendered alkaline and extracted with ether. On evaporation the ether leaves behind an oil, which boils under a pressure of 0.07 mm. at 107–110° C. This is the 1:2-dimethyl-4:4-phenyl-cyano-piperidine. It can be saponified and esterified according to known methods whereby with the use of ethyl alcohol 1:2-dimethyl-4:4-phenyl - carbethoxy - piperidine is obtained which forms an oil boiling at 105–109° C. under a pressure of 0.15 mm.

As starting product α-(meta-nitro-phenyl)-γ-(methyl-benzyl-amino)-butyric acid nitrile, e. g. can also be used and the nitro group in the resulting compounds converted in usual manner into an amino- or a hydroxy group.

The 1:2-dimethyl-4:4-phenyl-cyano-piperidine obtained can further be converted in known manner into the 1:2-dimethyl-4-phenyl-piperidine-4-carboxylic acid amide by partial saponification. For the manufacture of amides the obtained nitrile can also be completely saponified, the acid thus obtained converted into the acid chloride by treatment for example with thionyl chloride, and the acid chloride reacted with ammonia or amines. Thus, from the corresponding acid chloride and diethylamine there is obtained 1:2-dimethyl-4-phenyl-piperidine-4 - carboxylic acid diethylamide.

These amides can also be obtained by converting the above obtained 1:1-methyl-benzyl-2-methyl-4:4-phenyl-cyano - piperidinium bromide into the amides and subsequently splitting off the benzyl group.

*Example 3*

A solution of 65 parts of α-phenyl-γ-(diethylamino)-butyric acid nitrile in 200 parts of absolute ether is added drop by drop to 14 parts of powdered sodium amide in 300 parts of ether. After an hour's stirring 300 parts of ether are added, the mixture cooled with ice and then 60 parts of ethylene-dibromide added. Stirring is carried out for one hour at ice temperature, for another hour at room temperature and for four to six hours at the boiling temperature of the ether. The very consistent reaction mass is separated by filtration with suction, washed with ether and dried. 125 parts of a white readily water-soluble salt mixture are obtained which consists, besides of sodium bromide, chiefly of 1:1-diethyl-4:4-phenyl-cyano-piperidinium bromide. By treating the salt mixture with alcohol, the insoluble sodium bromide contained therein can be eliminated. If the piperidinium bromide or the hydroxide which can be prepared from it, is heated in the vacuum, there is produced by cleavage of ethyl bromide or ethyl alcohol, respectively, the 1 - ethyl - 4:4 - phenyl - cyano-piperidine which is an oil boiling at 110–112° C. under a pressure of 0.05 mm. It can be saponified and esterified in known manner or converted by means of Grignard's compounds into 1-ethyl-4-phenyl-piperidyl-(4)-ketones, such as 1-ethyl-4-phenyl-piperidyl-(4)ethylketone (oil of boiling point 100° C. under 0.1 mm. pressure).

These ketones can also be obtained if the 1:1-diethyl-4:4-phenyl-cyano-piperidinium bromide is treated with Grignard's compounds and the bromine and one of the ethyl groups are subsequently split off.

*Example 4*

18.8 parts of α-phenyl-γ-(dimethylamino)-butyric acid-nitrile (oil of boiling point 158–160° C. under 17 mm. pressure, obtained from benzylcyanide, β-dimethylaminoethyl chloride and sodium amide) are dissolved in 100 parts by volume of ether and allowed to flow into 5 parts of pulverized sodium amide in 80 parts by volume of ether. When the reaction is complete, the whole is cooled to −5° C., 18.8 parts of ethylene-dibromide in 50 parts by volume of ether are added, and the further procedure is as indicated in Example 3. The 1:1-dimethyl-4:4-phenyl-cyano-piperidinium bromide can be isolated from the suction-filtered crystal magma by treatment with alcohol in laminae of melting point 305–315° C. (with decomposition). By thermal decomposition of this substance or also of the crude crystal magma the 1-methyl-4:4-phenyl-cyano-piperidine described in Example 1 is obtained in good yield.

*Example 5*

6 parts of pulverized sodium in 80 parts by volume of toluene are converted into the phenyl sodium compound with 13.2 parts of chlorobenzene. 22 parts of α-(meta-methoxy-phenyl)-γ-(dimethylamino)-butyric acid nitrile (yellowish oil of boiling point 184–186° C. under 14 mm. pressure, prepared from meta-methoxy-benzylcyanide, β-dimethylaminoethylchloride and sodium amide) in 30 parts by volume of toluene are added drop by drop. After stirring for 3 hours a yellow green precipitate has separated. 18.8 parts of ethylene-dibromide in 100 parts by volume of toluene are added in drops at +10° C. to maximally 40° C., and the whole is further stirred for 15 hours. By filtering off and washing with ether there are obtained 45 parts of a nearly white powder. This yields on distillation (12 mm., 270–350° C. bath temperature) the 1-methyl-4:4-(meta-methoxyphenyl)-cyano-piperidine as a yellowish oil of boiling point 196–197° C. under 12 mm. pressure which solidifies on standing and then melts at about 40° C., methylbromide being split off from the quaternary compound.

On heating this nitrile with methanolic caustic soda solution to 190–200° C., there is obtained the 1-methyl-4-(meta - methoxyphenyl)-piperidine-4-carboxylic acid of melting point 322–323° C. (with decomposition) which yields the 1-methyl-4-(meta-methoxyphenyl)-piperidine - 4-carboxylic acid ethylester on esterification with alcohol (oil of boiling point 195–197° C. under 12 mm. pressure). The hydrochloride of this ester melts at 175–176° C.

When heating the above 1-methyl-4-(meta-methoxyphenyl)-piperidine - 4 - carboxylic acid with glacial acetic hydrogen bromide, there is formed the 1-methyl-4-(meta-hydroxyphenyl)-piperidine-4-carboxylic acid (brownish needles of melting point 280–285° C.). On esterification the 1-methyl-4-(meta-hydroxyphenyl) - piperidine-4-carboxylic acid ethylester is obtained therefrom which yields a hydrochloride of melting point 166–167° C.

When saponifying the 1-methyl-4:4-(meta-methoxyphenyl)-cyano - piperidine under mild conditions with methyl alcoholic caustic soda solution (2 hours at 160–170° C.), there is obtained the 1 - methyl-4-(meta-methoxyphenyl)-piperidine-4-carboxylic acid amide in the form of crystals which melt at 133–135° C. with decomposition.

If 1 - methyl-4-meta-methoxyphenyl-4-cyano-piperidine is caused to react with Grignard compounds, the corresponding ketones are obtained. With n-propyl-magnesium bromide there can be obtained 1 - methyl - 4-(meta-methoxyphenyl)-piperidyl-(4)-n-propylketone (hydrochloride of melting point 125–127° C.), from which the 1- methyl-4-(meta-hydroxyphenyl) - piperidyl - 4-n-propyl-ketone (a feebly yellowish oil) is obtained by boiling with hydrobromic acid. 1-methyl-4-(meta-hydroxyphenyl) - piperidyl-(4)-ethyl-ketone hydrobromide of melting point 190-191° C. is obtained in a corresponding manner with ethyl-magnesium bromide.

By acylating these hydroxy-ketones there can be obtained the corresponding acyl compounds, for example, the 1-methyl-4-(acetoxyphenyl)-piperidyl-(4)-n-propyl-ketone whose hydrochloride melts at 172-174° C.

*Example 6*

When replacing in Example 1 the 52.8 parts of α-phenyl - γ-(methyl - benzyl - amino)-butyric acid-nitrile by 58.8 parts of α-(ortho-methoxyphenyl)-γ-(methyl-benzylamino) - butyric acid-nitrile (a thick oil of boiling point 165-166° C. under 0.06 mm. pressure, prepared from ortho-methoxybenzyl - cyanide with β - chloroethyl-methyl-benzylamine in the presence of sodium amide), there is obtained the 1:1-methyl-benzyl-4:4-(ortho-methoxyphenyl) - cyano - piperidinium bromide in white crystals of melting point 203-204° C.

If this bromide is shaken in an aqueous alcoholic suspension with hydrogen and palladium, it takes up 1 mol of hydrogen and goes into solution. When filtering the solution to remove the palladium and concentrating, the hydrobromide of the 1-methyl-4:4-(ortho-methoxy-phenyl)-cyano-piperidine crystallizes in large brilliant crystals of melting point 262-264° C. The free base forms in ether rather sparingly soluble laminae of melting point 98-99° C.

*Example 7*

A solution of 436 parts of α-(meta-methoxyphenyl)-γ-(dimethylamino)-butyric acid nitrile in 1000 parts by volume of ether is gradually added, while stirring, to a suspension of 100 parts of pulverized sodium amide in 2000 parts by volume of ether. The sodium amide enters into solution with evolution of ammonia, but the sodium compound of the α-(meta-methoxy-phenyl)-γ-(dimethylamino)-butyric acid nitrile is soon precipitated as a sandy crystal powder. In order to complete the reaction the whole is boiled for 1 hour under reflux. After cooling to 0° C. or slightly below 0° C. a solution of 470 parts of p-toluene sulfonic acid-β-chlorohydrin ester in 1000 parts by volume of ether is added in such a manner that the temperature does not exceed 0° C. After further stirring for ½ hour the whole is suction-filtered to remove the precipitated sodium-toluene sulfonate. The condensation product corresponding to the Formula IIa is found in the filtrate. Already on allowing this ether solution to stand gradual ring closure to the quaternary base occurs, i. e. to the 1:1-dimethyl-4-(meta-methoxy-phenyl)-4-cyano-piperidinium chloride, which is left behind as a hard, white crystal cake on evaporating the ether solution. It can be recrystallized from alcohol. When heating this salt to 230-250° C. under 12 mm. pressure, it is decomposed without melting, and the 1 - methyl-4-(m-methoxy-phenyl)-4-cyano-piperidine described in Example 5 is distilled in theoretical yield which solidifies immediately.

By reacting 230 parts of this nitrile with a Grignard solution prepared from 25 parts of magnesium and the necessary quantity of bromomethyl, there is formed 1-methyl-4-(methoxyphenyl) - piperidyl-(4)-methylketone which is converted into the 1-methyl-4-(m-hydroxy-phenyl)-piperidyl-(4)-methyl-ketone of melting point 158-159° C. by boiling with hydrobromic acid and subsequently treating with ammonia.

This ketone can as well be prepared from the quaternary piperidinium-nitrile-chloride in the following manner: 24 parts of magnesium chips are converted under 500 parts of absolute ether with methylbromide into the Grignard compound. There are added 140 parts of finely ground 1:1-dimethyl-4:4-(m-methoxyphenyl)-cyanpiperidinium-chloride and 500 parts by volume of ether. There occurs but a slight reaction. The mass is then refluxed for 20 hours while thoroughly stirring and the greater part of the ether is then distilled off. 250 parts of ice are added to the solidified residue and the whole is neutralized with concentrated hydrochloric acid. After the addition of another 50 parts by volume of hydrochloric acid, the mass is heated for some time on the water bath.

The aqueous solution so obtained contains the quaternary methylketone. It is precipitated advantageously as a difficultly soluble perchlorate by the addition of a solution of 65 parts of sodium perchlorate. In methanol, for instance, by reaction with potassium chloride, with formation of the difficultly soluble potassium perchlorate, the perchlorate of melting point 163-165° C. is convertible into 1:1-dimethyl-4-(m-methoxyphenyl) - piperidinium - chloride-(4)-methylketone. When the latter is heated in vacuo to 250-270° C. it decomposes and 1-methyl-4-(m-methoxyphenyl) - piperidyl-(4)-methylketone distills off and can be converted into 1-methyl-4-(m-hydroxy-phenyl)-piperidyl-(4)-methylketone as described above.

*Example 8*

872 parts by weight of α-(meta-methoxyphenyl)-γ-(dimethylamino)-butyric acid nitrile are added drop by drop to 200 parts by weight of powdered sodium amide, suspended in 4000 parts by volume of toluene, while stirring and cooling with water, at a temperature of about 20° C. After another five hours of stirring at the same temperature the whole is cooled with ice and 576 parts by weight of ethylene chlorobromide are run in fast enough to keep the temperature constantly between +8 and +10° C. The temperature then quickly sinks to +2 to +3° C. 15 minutes later, 480 parts by weight of ice are added, the toluene layer is removed from the salt sludge and heated for 1½ to 2 hours on the waterbath, the entire mass solidifying. The separated quaternary 1:1-dimethyl - 4 - (meta-methoxy-phenyl)-4-cyano-piperidinium chloride described in Example 7 is removed by suction-filtering and dried. An additional portion of the quaternary salt may be gained from the salt sludge. The yield is 80 per cent. or more of the calculated yield. 140 parts by weight of this chloride are ground in a roller mill for 20-24 hours at 40-45° C. together with a Grignard solution prepared from 18 parts by weight of magnesium and 90 parts by weight of ethyl bromide in 700 parts by volume of ether. After the addition of 100 parts by weight of ice the separated ether is removed and the residual sludge dissolved in 250 parts by weight of ice and 400 parts by volume of 5-normal hydrochloric acid, and the solution heated on the waterbath for one hour. 75 parts by weight of sodium perchlorate in 150 parts by volume of water are then added to the hot solution whereupon 1:1-dimethyl-4-(meta-methoxy-phenyl)-piperidinium-4-ethylketone-perchlorate of melting point 158-160° C. is obtained in nearly quantitative yield. After being filtered off with suction, it is converted into the corresponding chloride with 40 per cent. of its weight of powdered potassium chloride in methanol of 70 per cent. strength. The chloride remains behind as a crystalline mass when the methanol solution, filtered away from the potassium perchlorate, is evaporated. When this quaternary salt is heated under reduced pressure to about 250° C., 1-methyl - 4 -(meta - methoxy - phenyl) - piperidyl -(4)- ethylketone distills over in the form of a slightly turbid oil which can be converted into 1-methyl-4 - (meta - hydroxyphenyl)-piperidyl-(4)-ethylketone of melting point 154–155° C. by boiling with 2 parts by volume of concentrated hydrobromic acid. More than 75 per cent. of the weight of hydroxyketone are obtained calculated on the quaternary nitrile chloride.

Other 4-phenyl-piperidyl-(4)-ketones can be obtained in analogous manner by the reaction of corresponding Grignard compounds for example, of other alkyl- or of cycloalkyl, aralkyl, or arylmagnesium halides and decomposition of the resultant ketimides, for example, with dilute acids. The quaternary ketones obtained may be isolated, advantageously in the form of their perchlorates. They can alternatively be converted into their tertiary derivatives without prior isolation. There may thus be prepared tertiary 4 - (meta-hydroxy-phenyl) - piperidyl-(4)-ketones whose keto group is linked, instead of to the methyl or ethyl radical, with the propyl, butyl, cyclohexyl or phenyl radical and whose ring nitrogen atom is substituted by another hydrocarbon radical, like another alkyl radical, such as an ethyl, propyl or cycloalkyl radical.

*Example 9*

10 parts by volume of acetic acid and 5 parts by volume of acetyl chloride are poured over 2 parts by weight of 1-methyl-4-(meta-hydroxyphenyl) - piperidyl - (4) - ethylketone - hydrochloride. After heating on the waterbath in a reflux apparatus for 1 hour the separation of hydrochloric acid ceases. The acetic acid and the excess acetylchloride are distilled off under reduced pressure and the sirupy residue dissolved in hot acetone. After cooling, the 1-methyl-4-(meta - acetoxyphenyl) - piperidyl - (4) - ethylketone-hydrochloride precipitates in the form of colorless crystals melting at 173–175° C.

*Example 10*

24.7 parts by weight of 1-methyl-4-(meta-hydroxyphenyl) - piperidyl - (4) - ethylketone are mixed with 25 parts by volume of acetic acid and then carefully mixed with 15 parts of acetylchloride. The base passes into solution, evolving much heat. After brief heating on the waterbath all volatile material is distilled off under reduced pressure and the residue dissolved in acetone. The hydrochloride which precipitates in the form of crystals is the same as that of Example. 10.

*Example 11*

If the 1-methyl-4-(meta-hydroxyphenyl)-piperidyl-(4)-ethylketone of Example 10 is replaced by 23.3 parts by weight of the corresponding methylketone, there is obtained after further processing, the hydrochloride of 1-methyl-4-(meta-acetoxyphenyl) - piperidyl-(4)-methylketone which melts at 235–236° C. The free base is a thick oil boiling at 143–146° C. under 0.2 mm. pressure.

*Example 12*

23.3 parts by weight of 1-methyl-4-(meta-hydroxyphenyl) - piperidyl - (4) - methylketone are reacted in a manner analogous to that described in Example 10 with 14 parts by weight of propionic acid chloride with the addition of 25 parts by volume of propionic acid. Upon further processing the hydrochloride of 1-methyl-4-(meta-propionyloxyphenyl) - piperidyl - (4) - methylketone is obtained in the form of colorless crystals melting at 201–202° C.

*Example 13*

50 parts by volume of chloroform are poured over 11.64 parts by weight of 1-methyl-4-(meta-hydroxyphenyl) - piperidyl - (4) - methylketone. After the addition of 10 parts by weight of benzoylchloride, the material is heated for several hours on the waterbath in a reflux apparatus. After distilling off the chloroform the residual crystal magma is triturated with acetone, the material is suction-filtered and recrystallized from methanol. 1-methyl-4-(meta-benzoyloxyphenyl) - piperidyl - (4) - methyl - ketone - hydrochloride is sparingly soluble in cold water and melts at 248–251° C.

*Example 14*

100 parts by volume of absolute alcohol in which 1.5 parts by weight of sodium are dissolved, are poured over 11.55 parts by weight of 1-methyl - 4 - (meta - hydroxyphenyl) - piperidyl - (4) - methyl-ketone. 33 parts by volume of a 20 per cent. by volume solution of phosgene in toluene are added dropwise while stirring and cooling with ice. An hour later, the material is decomposed with ice, ammonia is added and the precipitated base is extracted with ether. The addition of a solution of hydrochloric acid in alcohol to the ethereal solution causes the hydrochloride of the ethyl carboxylic acid ester of 1-methyl - 4 - (meta - hydroxyphenyl) - piperidyl - (4) - methylketone of the formula

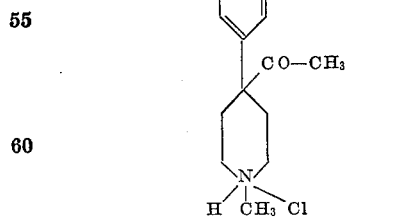

to precipitate in the form of crystal powder which after being recrystallized from alcohol melts at 182–183° C. with strong decomposition.

If, in this example, there are used, in lieu of the methylketone, 12.4 parts of the corresponding ethylketone, the chlorohydrate of the ethylcarboxylic acid ester of 1-methyl-4-(meta-hydroxyphenyl) - piperidyl - (4) - ethylketone is obtained in the form of readily soluble crystals, melting at 141–143° C. with considerable decomposition.

What we claim is:

1. Esters of 4-phenyl-piperidyl-(4)-ketones of the formula

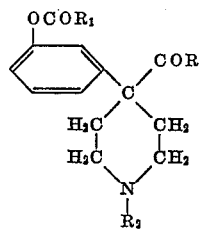

wherein R and R₂ each stands for a lower alkyl group, and R₁ stands for a member selected from the group consisting of lower alkyl and phenyl.

2. 1 - methyl - 4 - (meta - acetoxyphenyl) - piperidyl -(4)-ethylketone of the formula

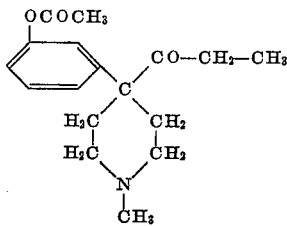

3. 1 - methyl - 4 - (meta - acetoxyphenyl) - piperidyl-(4)-methylketone of the formula

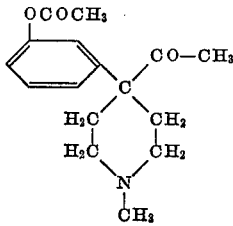

4. 1 - methyl - 4 - (meta - acetoxyphenyl) - piperidyl-(4)-n-propylketone of the formula

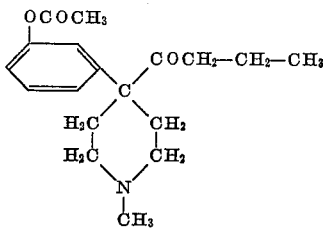

KARL MIESCHER.
HANS KAEGI.

REFERENCES CITED

The following references are of record in the file of this patent:

UNITED STATES PATENTS

| Number | Name | Date |
|---|---|---|
| 657,880 | Schmidt | Sept. 11, 1900 |
| 692,656 | Harries | Feb. 4, 1902 |
| 2,167,351 | Eisleb | July 25, 1939 |
| 2,248,018 | Eisleb | July 1, 1941 |
| 2,398,575 | Bergel et al. | Apr. 16, 1946 |

FOREIGN PATENTS

| Number | Country | Date |
|---|---|---|
| 106,492 | Germany | Dec. 6, 1899 |
| 218,517 | Switzerland | Apr. 1, 1942 |
| 222,484 | Switzerland | Oct. 16, 1942 |
| 222,485 | Switzerland | Oct. 16, 1942 |
| 222,731 | Switzerland | Oct. 16, 1942 |

OTHER REFERENCES

Von Braun: Liebig Annalen der Chemie, vol. 382 (1911), p. 2.

Bergel et al.: Jour. Chem. Soc. (London), p. 264 (1944).

Schauman: Archiv, für Exp. Path. Pharm., vol. 196, pp. 127–129.

Certificate of Correction

Patent No. 2,486,796 November 1, 1949

KARL MIESCHER ET AL.

It is hereby certified that errors appear in the printed specification of the above numbered patent requiring correction as follows:

Column 2, line 12, for "tolueune" read *toluene*; column 3, line 12, formula IIb, for that portion of the formula reading "$C_6H_5$—CH—C" read $C_6H_5$—$CH$—$CN$; column 9, line 67, for the numeral "10" read *9*;

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*